US012649337B2

(12) United States Patent  (10) Patent No.: US 12,649,337 B2
Choi et al.  (45) Date of Patent: Jun. 9, 2026

(54) LOW NOISE TIRE

(71) Applicant: **HANKOOK TIRE &
TECHNOLOGY CO., LTD.**,
Seongnam-si (KR)

(72) Inventors: Min Hyun Choi, Daejeon (KR); **Il Sik
Kim**, Daejeon (KR)

(73) Assignee: **HANKOOK TIRE &
TECHNOLOGY CO., LTD.**,
Seongnam-si (KR)

( * ) Notice: Subject to any disclaimer, the term of this
patent is extended or adjusted under 35
U.S.C. 154(b) by 0 days.

(21) Appl. No.: 18/395,009

(22) Filed: Dec. 22, 2023

(65) Prior Publication Data

US 2025/0115081 A1     Apr. 10, 2025

(30) Foreign Application Priority Data

Oct. 10, 2023    (KR) ........................ 10-2023-0134626

(51) Int. Cl.
B60C 11/24          (2006.01)
B60C 11/13          (2006.01)
(52) U.S. Cl.
CPC ...... B60C 11/1307 (2013.01); B60C 11/1353
(2013.01); B60C 11/1369 (2013.01);
(Continued)
(58) Field of Classification Search
CPC ............. B60C 11/1307; B60C 11/1353; B60C
11/1369; B60C 11/24; B60C 2011/1338;
B60C 2011/1361
See application file for complete search history.

(56) References Cited

U.S. PATENT DOCUMENTS 5,031,680 A *   7/1991  Kajikawa .............. B60C 11/033
152/902
2001/0032691 A1* 10/2001  Ohsawa .................. B60C 11/13
152/209.18
(Continued)

FOREIGN PATENT DOCUMENTS

EP          2676815 A1 * 12/2013   ......... B60C 11/1307
JP        07-205615 A  *  8/1995
(Continued)

OTHER PUBLICATIONS

Machine translation for Europe 2676815 (Year: 2025).*
(Continued)

*Primary Examiner* — Steven D Maki
(74) *Attorney, Agent, or Firm* — Bridgeway IP Law
Group, PLLC; Jihun Kim

(57)          ABSTRACT
An embodiment describes a low noise tire that reduces noise
caused by air column resonance occurring in a main groove
and has a fluid flow path to prevent a surface layer from
being roughened during a mold casting process. A low noise
tire according to an embodiment includes a plurality of
blocks formed on a tread, a groove formed between the
blocks and extending in a circumferential direction of a tire,
protrusion portions including a plurality of protrusion bodies
protruding from a bottom surface and a wall surface of the
groove and extending along the groove, and fluid flow paths
formed along the wall surface of the groove and configured
to divide the protrusion portions while traversing the pro-
trusion portions so that a fluid positioned between the
protrusion portions moves.

13 Claims, 10 Drawing Sheets

(52) U.S. Cl.
　　CPC ....... B60C 11/24 (2013.01); *B60C 2011/1338*
　　　　　　*(2013.01); B60C 2011/1361* (2013.01)

(56)　　　　　　　　References Cited

U.S. PATENT DOCUMENTS

| | | | |
|---|---|---|---|
| 2006/0090828 A1* | 5/2006 | Yamane | ................ B60C 11/042 |
| | | | 152/209.18 |
| 2018/0072107 A1* | 3/2018 | Muhlhoff | ............ B60C 11/1353 |
| 2021/0138844 A1* | 5/2021 | Kim | .................... B60C 11/1353 |
| 2024/0051348 A1* | 2/2024 | Maeda | ................ B60C 11/1307 |

FOREIGN PATENT DOCUMENTS

| | | | | | |
|---|---|---|---|---|---|
| JP | 2002-219906 A | | 8/2002 | | |
| JP | 2005-329793 A | * | 12/2005 | ......... | B60C 11/1218 |
| JP | 2017-024714 A | * | 2/2017 | ............ | B60C 11/24 |
| KR | 2013-0046188 A | * | 5/2013 | | |
| KR | 10-1779879 B1 | | 9/2017 | | |
| KR | 2019-0045635 A | * | 5/2019 | | |
| KR | 10-2022-0169213 A | | 12/2022 | | |

OTHER PUBLICATIONS

Machine translation for Korea 2013-0046188 (Year: 2025).*
Machine translation for Korea 2019-0045635 (Year: 2025).*
Machine translation for Japan 07-205615 (Year: 2025).*
Machine translation for Japan 2017-024714 (Year: 2025).*
Machine translation for Japan 2005-329793 (Year: 2025).*

* cited by examiner (a)

(b)

151, 251

(a)                                                (b)

LOW NOISE TIRE

CROSS REFERENCE TO RELATED APPLICATION

The present application claims priority to Korean Patent Application No. 10-2023-0134626 filed on Oct. 10, 2023, in the Korean Intellectual Property Office, the entire contents of which are incorporated herein for all purposes by this reference.

STATEMENT REGARDING PRIOR DISCLOSURES BY THE INVENTORS

The inventors of the present application are the inventors of the patent publication, "LOW NOISE TIRE" published on Dec. 27, 2022, as Korean Patent Publication No. 10-2022-0169213, one year or less before the effective filing date of the present application, which is not prior art under 35 U.S.C. 102(b)(1)(A).

BACKGROUND OF THE INVENTION

Field of the Invention

The present invention relates to a low noise tire, and more particularly, to a low noise tire that reduces noise caused by air column resonance occurring in a main groove and has a fluid flow path to prevent a surface layer from being roughened during a mold casting process.

Description of the Related Art

In general, a process of blocking noise is performed by using soundproofing materials, sound absorbing materials, and the like to reduce noise such as engine noise and wind noise from the inside and outside of a vehicle while driving.

In the related art, there has been a focus on reducing noise of internal components of a vehicle, such as an engine. However, recently, the tire noise performance indication requirements have been enforced since 2020 in Korea and 2003 in Europe, and there has been an increasing need for technologies for minimizing noise generated by external components of the vehicle, such as tires.

In particular, recently, tires for electric vehicles, the market share of which has been growing rapidly, are required to have different noise characteristics from those of internal combustion engine (ICE) vehicles. Specifically, in the case of the internal combustion engine vehicle, noise generated from the engine causes the loudest noise over the entire range of noise in a vehicle interior. However, because the electric vehicle is not equipped with an engine, an overall noise level of the electric vehicle is low, and thus the importance of a low noise tire further increases.

The noise generated by the tire has a peak in a 1 kHz region because of pipe resonance, and this noise accounts for a very large proportion of the total noise. Specifically, when a main groove, which is formed in a tire traveling direction, comes into contact with the ground surface, a pipe shape is formed, and a flow of air flowing through the pipe generates an air column resonance sound in a 1 kHz band.

Korean Patent No. 1779879 (entitled 'Tire Resonance Noise Reducing Device') discloses a rim, a tire connected to the rim having an inner surface spaced apart from the rim in a radial direction of the rim, a blocking part mounted on an outer peripheral surface of the rim and configured such that when the tire rotates, one end thereof is connected to the rim, and the other end rotates in a circumferential direction of the tire to block a part or the entirety of a space between the rim and the tire, and a restoring part configured to restore the other end of the blocking portion toward the rim when the tire is stopped.

In the related art, a knurled structure is adopted to reduce the air column resonance sound. However, there is a problem in that the knurled structure has a poor noise dispersion effect. In addition, the knurled structures formed in the main grooves of the current tires are mostly used as elements for improving wet performance and design but do not effectively reduce noise.

Accordingly, there is a need for a technology to effectively reduce noise caused by air column resonance occurring in the main groove.

DOCUMENT OF RELATED ART

Korean Patent No. 1779879

SUMMARY OF THE INVENTION

The present invention is proposed to solve these problems and aims to provide a low noise tire capable of reducing noise caused by air column resonance occurring in a main groove.

The present invention also aims to form a fluid flow path to prevent a surface layer from being roughened because moisture cannot be discharged during a mold casting process.

The present invention also aims to form an abrasion indicator to identify a degree of abrasion of a tire.

The present invention also aims to form an abrasion indicator on a flat surface to measure an accurate height of the abrasion indicator.

Technical problems to be solved by the present invention are not limited to the above-mentioned technical problems, and other technical problems, which are not mentioned above, may be clearly understood from the following descriptions by those skilled in the art to which the present invention pertains.

In order to achieve the above-mentioned objects, the present invention provides a low noise tire including: a plurality of blocks formed on a tread; a groove formed between the blocks and extending in a circumferential direction of a tire; protrusion portions including a plurality of protrusion bodies protruding from a bottom surface and a wall surface of the groove and extending along the groove, and fluid flow paths formed along the wall surface of the groove and provide flow paths for air in the groove, in which the fluid flow paths discharge fluid droplets positioned between the protrusion portions to the outside of the tire.

In the embodiment of the present invention, a width of the fluid flow path may be 0.03 to 5 mm.

In the embodiment of the present invention, the low noise tire may further include: an air slag formed in a groove shape in the groove.

In the embodiment of the present invention, the low noise tire may include: an abrasion indicator coupled to the bottom surface of the groove and protruding from the bottom surface of the groove.

In the embodiment of the present invention, the abrasion indicator may include: a support groove provided in the form of a flat plate-shape groove in the bottom surface of the groove; and a recognition protrusion body protruding from an upper portion of the support groove and coupled to at least a part of the groove.

In the embodiment of the present invention, the protrusion portion may include: a plurality of first protrusion bodies protruding from the bottom surface and the wall surface of the groove; and a plurality of second protrusion bodies protruding from the bottom surface and the wall surface of the groove.

In the embodiment of the present invention, a cross-sectional area of the second protrusion body in a direction perpendicular to the ground surface may be 0 to 90% of a cross-sectional area of the first protrusion body in the direction perpendicular to the ground surface.

In the embodiment of the present invention, one pitch may be formed by including one or more first protrusion bodies and one or more second protrusion bodies, and a plurality of pitches may be repeatedly formed.

In the embodiment of the present invention, the pitch may include a first group including one or more first protrusion bodies and a second group including one or more second protrusion bodies, and the first group and the second group may intersect each other.

In the embodiment of the present invention, the plurality of protrusion bodies may be provided in parallel.

In the embodiment of the present invention, when an angle at which the plurality of protrusion bodies extends in parallel with the circumferential direction of the tire is 0 degree, the plurality of protrusion bodies may extend to have an angle of 0 degree or more and 360 degrees or less.

In the embodiment of the present invention, when the plurality of protrusion portions extends in a direction that is not parallel to the circumferential direction of the tire, a height of two opposite ends of the plurality of protrusion portions may decrease toward an upper end of the wall surface of the groove, and the height at an uppermost end of the groove may converge on 0 to 2 mm.

In the embodiment of the present invention, the two opposite ends of the plurality of protrusion portions may be points of 10 to 50% of an overall depth of the groove from the upper end of the groove.

In the embodiment of the present invention, a height of the first protrusion body may be 0.1 to 2 mm, an area of the first protrusion body may be 0.1 to 2 mm², a height of the second protrusion body may be 0.09 to 1.8 mm, and an area of the second protrusion body may be 0.09 to 1.8 mm².

In the embodiment of the present invention, an interval between the first protrusion body and the second protrusion body may be 0.05 to 4 mm.

In the embodiment of the present invention, the plurality of protrusion bodies may be spaced apart from one another at predetermined intervals and formed over an entire region of the groove.

In the embodiment of the present invention, a cross-sectional shape of the protrusion body may be a circular or polygonal shape.

In the embodiment of the present invention, the protrusion body may have a height constant in a longitudinal direction of the groove.

In the embodiment of the present invention, the protrusion body may extend in a longitudinal direction of the groove and extend in a rectilinear or curved shape.

DETAILED DESCRIPTION OF THE INVENTION

Figure 1:
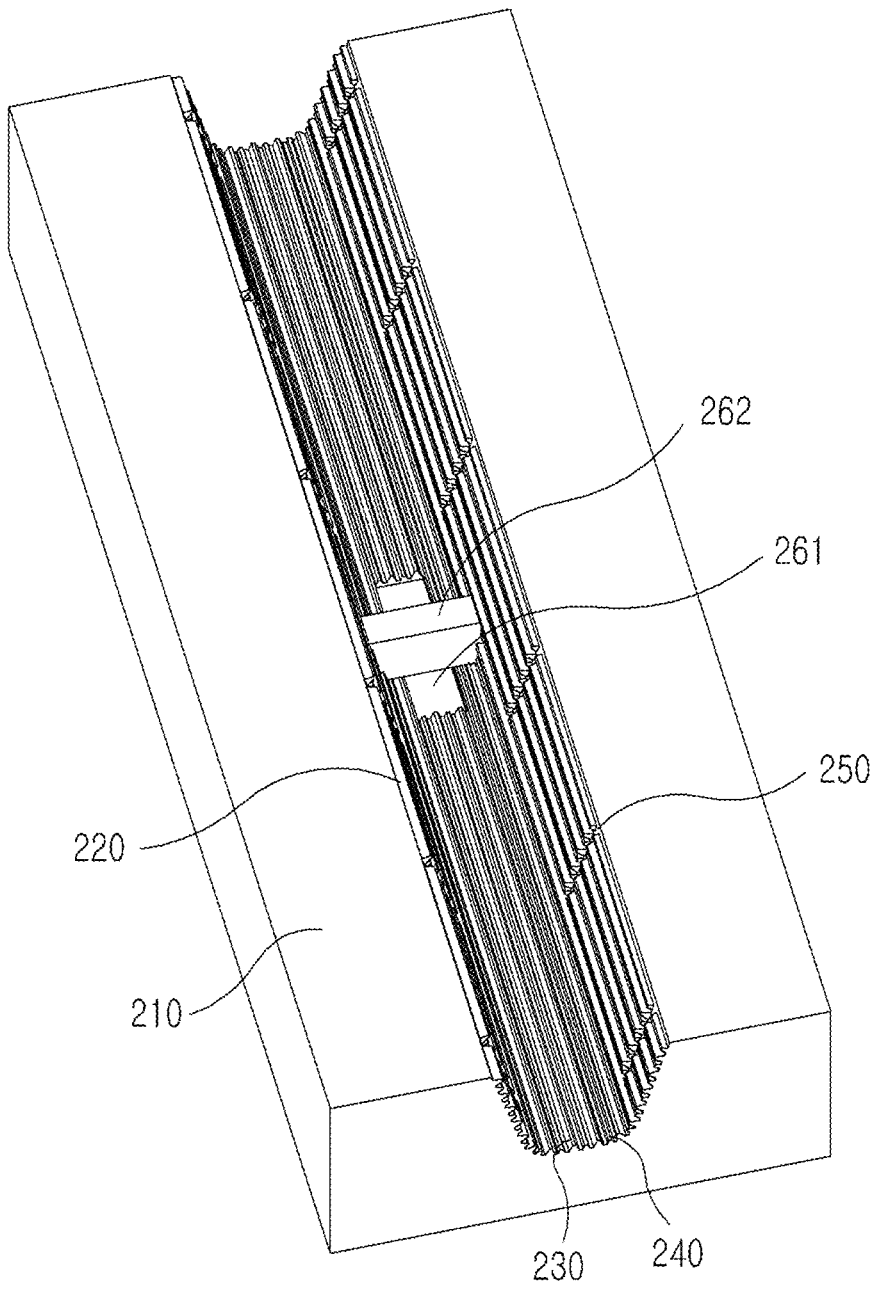
FIG. 1 is a perspective view of a low noise tire according to a second embodiment of the present invention.

Hereinafter, the present invention will be described with reference to the accompanying drawings. However, the present invention may be implemented in various different ways and is not limited to the embodiments described herein. Further, a part irrelevant to the description will be omitted in the drawings in order to clearly describe the present invention, and similar constituent elements will be designated by similar reference numerals throughout the specification.

Throughout the present specification, when one constituent element is referred to as being "connected to (coupled to, in contact with, or linked to)" another constituent element, one constituent element can be "directly connected to" the other constituent element, and one constituent element can also be "indirectly connected to" the other element with other elements interposed therebetween. In addition, unless explicitly described to the contrary, the word "comprise/include" and variations such as "comprises/includes" or "comprising/including" will be understood to imply the inclusion of stated elements, not the exclusion of any other elements.

The terms used in the present specification are used to just describe a specific embodiment and do not intend to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, the present invention will be described in detail with reference to the accompanying drawings.

Figure 2:
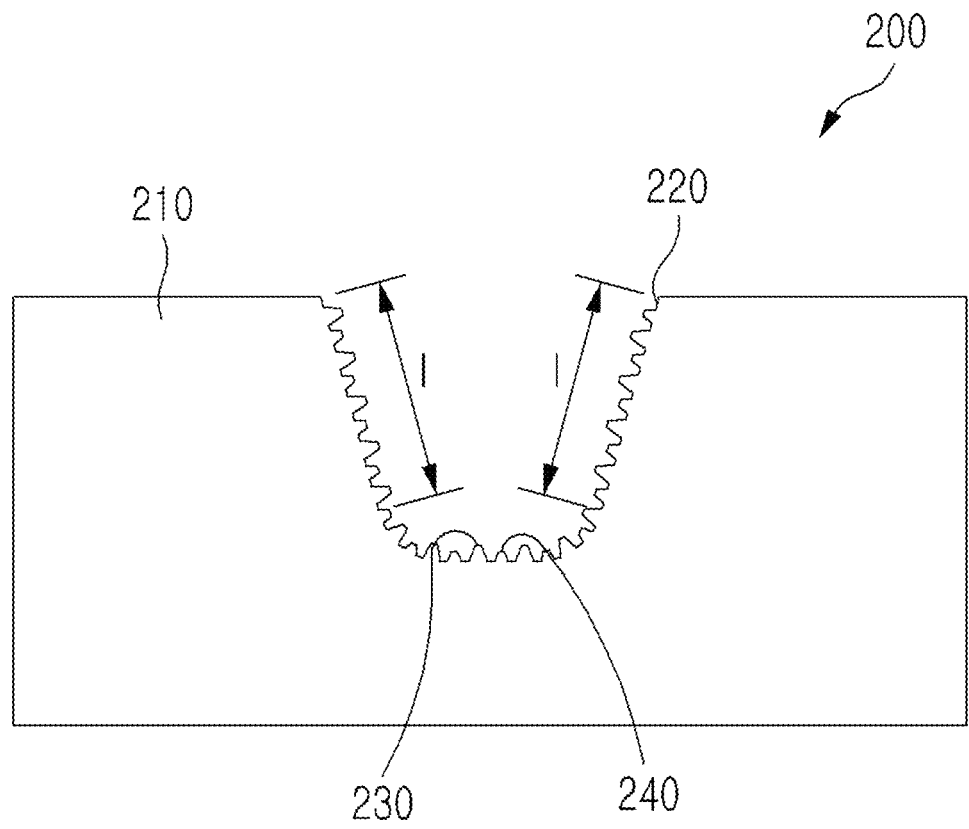
FIG. 2 is a front view of the low noise tire according to the second embodiment of the present invention.
Figure 3:
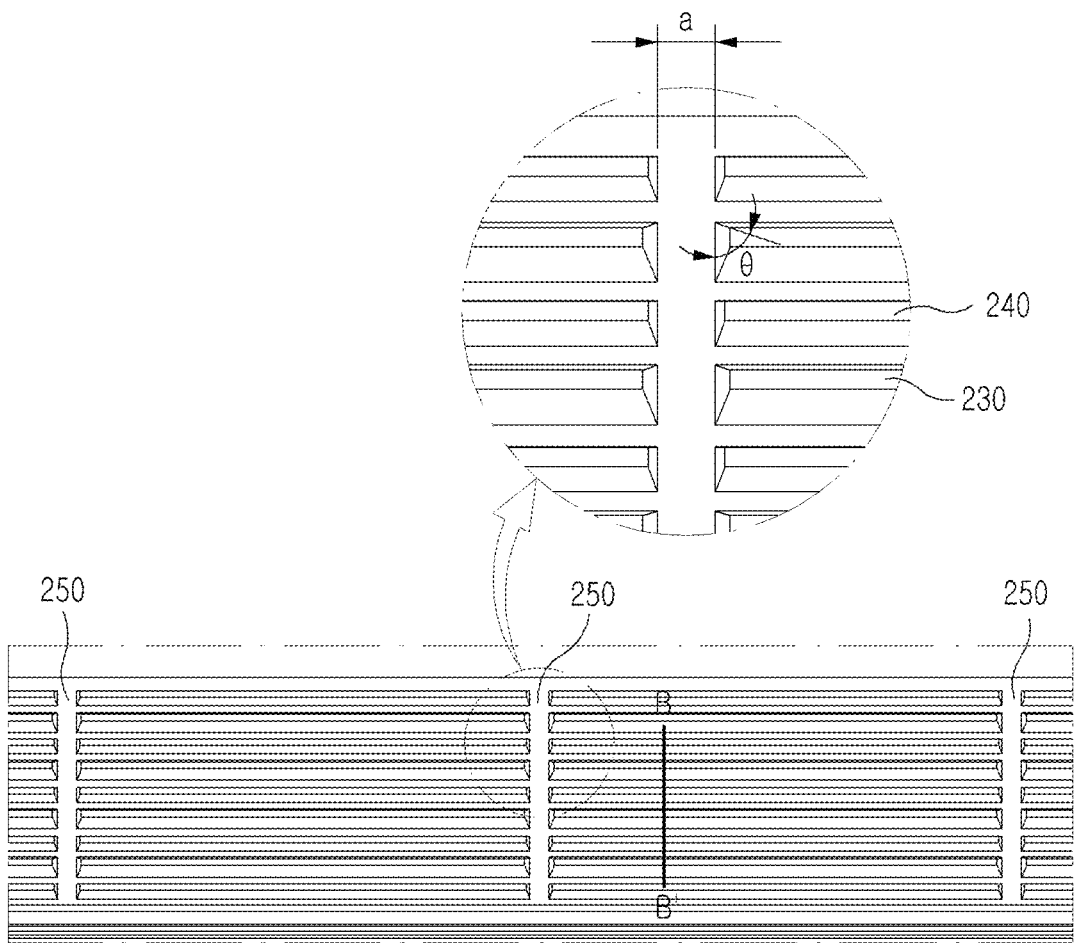
FIG. 3 is a cross-sectional view and an enlarged view illustrating the low noise tire according to the second embodiment of the present invention when viewed from the lateral side.
Figure 4:
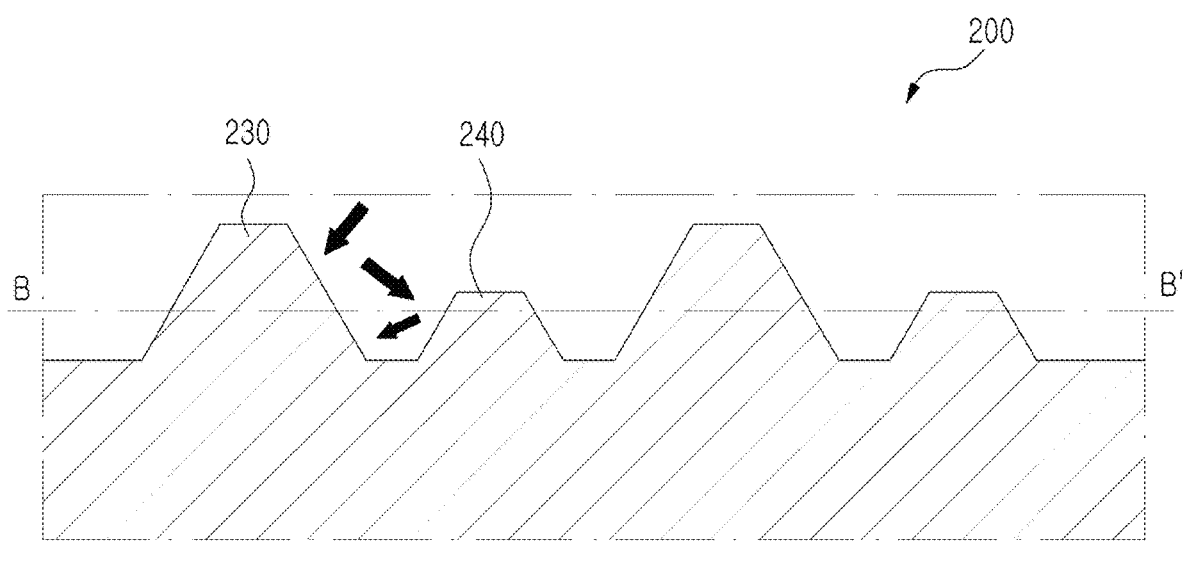
FIG. 4 is a cross-sectional view taken along line B-B' in FIG. 3.
Figure 5:
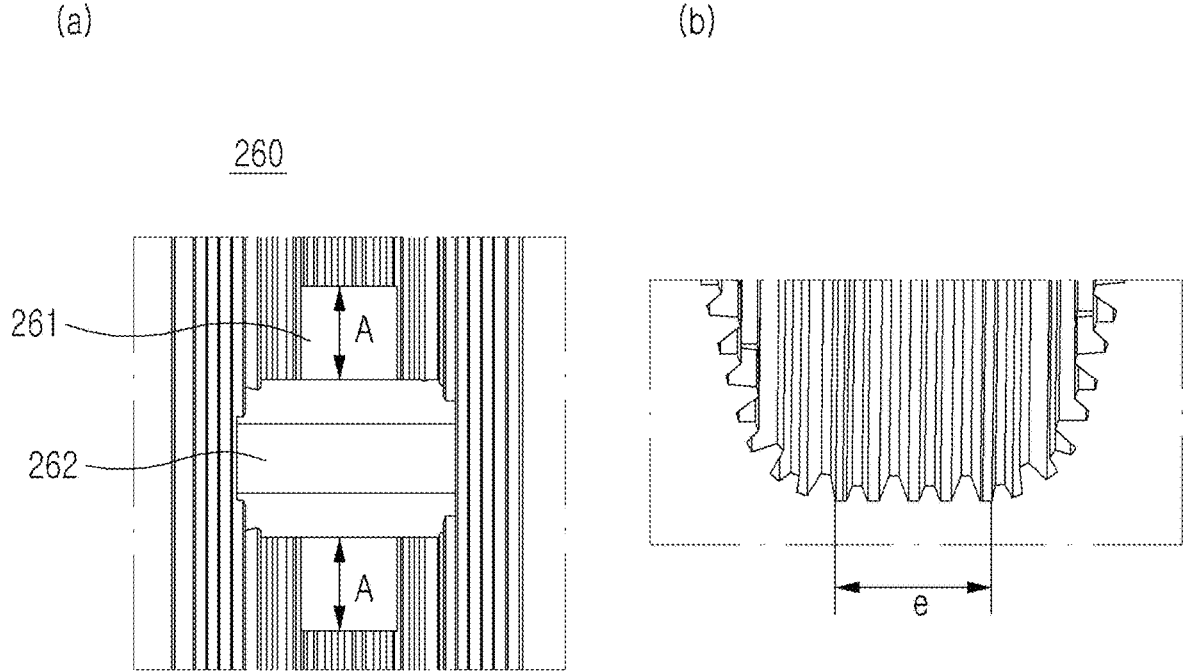
FIG. 5 is a top plan view illustrating an abrasion indicator according to the second embodiment of the present invention.
Figure 6:
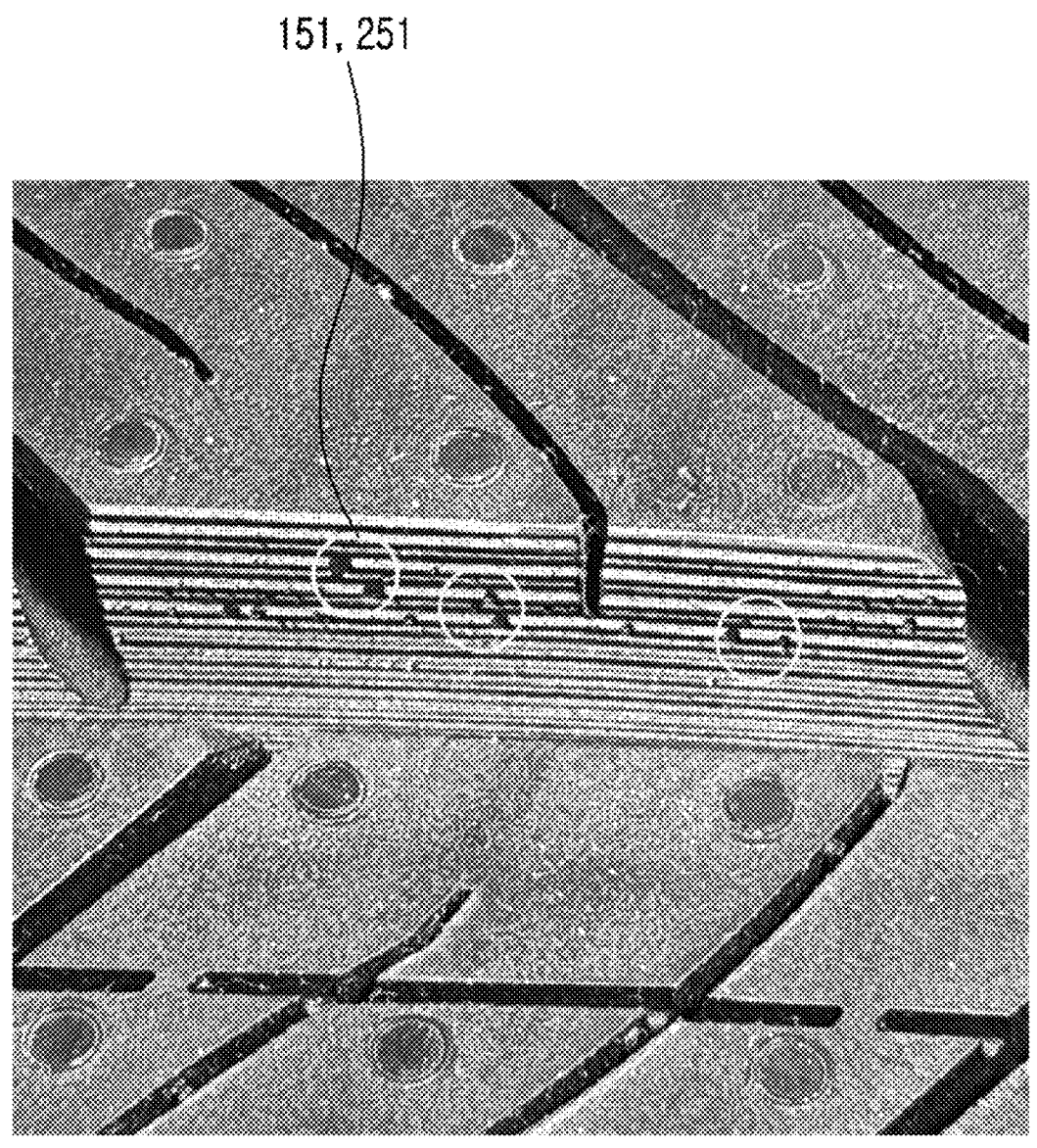
FIG. 6 is an image illustrating air slags.

FIG. 1 is a perspective view of a low noise tire according to a second embodiment of the present invention, FIG. 2 is a front view of the low noise tire according to the second embodiment of the present invention, FIG. 3 is a cross-sectional view and an enlarged view illustrating the low noise tire according to the second embodiment of the present invention when viewed from the lateral side, FIG. 4 is a cross-sectional view taken along line B-B' in FIG. 3, FIG. 5 is a top plan view illustrating an abrasion indicator according to the second embodiment of the present invention, and FIG. 6 is an image illustrating air slags.

As illustrated in FIG. 1, a low noise tire 200 according to a second embodiment of the present invention may include blocks 210, a groove 220, protrusion portions, fluid flow paths 250, an abrasion indicator 260, and air slags 251. The plurality of blocks 210 may be formed on a tire tread and define portions that come into contact with the ground surface.

The groove 220 may be formed between the blocks 210 and define a main groove extending in a circumferential direction of the tire. The groove 220 may include one side wall surface inclined downward from an upper portion and formed to be straight and flat, a bottom surface coupled to one side wall surface and formed to be straight and parallel to the ground surface, and the other side wall surface coupled to the bottom surface and formed to be flat and symmetric together with one side wall surface. The groove 220 may include one side coupling surface coupled to one side wall surface and the bottom surface and formed as a curved portion, and the other side coupling surface coupled to the other side wall surface and the bottom surface and formed as a curved portion.

The protrusion portions may include bottom protrusion portions protruding from the bottom surface of the groove 220 and extending along the groove 220, wall surface protrusion portions protruding from the wall surfaces of the groove and extending along the groove, and coupling protrusion portions coupled to one side coupling surface and the other side coupling surface and formed as curved portions. In this case wall, as illustrated in FIG. 2, the surface protrusion portions may be formed over a length 1. As illustrated in FIG. 5, a length of the bottom protrusion portions may be set to e in a direction perpendicular to the longitudinal direction of the groove 220.

The protrusion portions may include a plurality of protrusion bodies protruding from the bottom surface and the wall surfaces of the groove 220, extending along the groove, and having different heights. The protrusion bodies may be classified into one or more types depending on the heights thereof. The protrusion bodies may be provided to define one pitch and reduce noise energy by increasing thermal friction energy generated by the flow.

Hereinafter, the protrusion bodies, which constitute the protrusion portions, will be described with reference to a specific embodiment. However, the number of protrusion bodies included in the protrusion portion is not limited to two. Hereinafter, for convenience of description, the number of protrusion bodies is described as being two. However, the number of protrusion bodies having different heights is not limited to two, and the number of protrusion bodies may be two or more.

The protrusion portion may include a first protrusion body 230 and a second protrusion body 240. The plurality of first protrusion bodies 230 may protrude from the bottom surface and the wall surfaces of the groove 220, and the plurality of second protrusion bodies 240 may protrude from the bottom surface and the wall surfaces of the groove.

In this case, a protruding height of the first protrusion body 230 may be larger than a protruding height of the second protrusion body 240. More specifically, a cross-sectional area of the second protrusion body 240 in a direction perpendicular to the ground surface may be 0 to 90% of a cross-sectional area of the first protrusion body 230 in the direction perpendicular to the ground surface.

For example, a height of the first protrusion body 230 may be 0.1 to 2 mm, and a height of the second protrusion body 240 may be 0.09 to 1.8 mm. However, the protruding height of the first protrusion body 230 may be equal to the protruding height of the second protrusion body 240. In addition, an area of the first protrusion body 230 may be 0.1 to 2 mm$^2$, and an area of the second protrusion body 240 may be 0.09 to 1.8 mm$^2$.

Further, the first protrusion body 230 and the second protrusion body 240 may extend in parallel with each other. The first protrusion body 230 and the second protrusion body 240 may be spaced apart from each other at a predetermined interval.

For example, the interval between the first protrusion body 230 and the second protrusion body 240 may be 0.05 to 4 mm. The first protrusion bodies 230 and the second protrusion bodies 240, which are provided as described above, may be provided at predetermined intervals over the entire region of the groove 220.

More specifically, one or more first protrusion bodies 230 and one or more second protrusion bodies 240 are included and provided to define one pitch, and the pitches may be repeatedly formed over the entire region of the groove 220.

For example, the pitch may include one first protrusion body 230 and one second protrusion body 240, and the plurality of pitches may be repeatedly formed at predetermined intervals.

Alternatively, the pitch may include the first protrusion body 230, the second protrusion body 240, the second protrusion body 240, and the first protrusion body 230 in this order, and the pitches may be repeatedly formed at predetermined intervals.

In addition, the pitch may be provided such that a first group including one or more first protrusion bodies 230 and a second group including one or more second protrusion bodies 240 intersect each other.

For example, the first group may include three first protrusion bodies 230 and two second protrusion bodies 240. Further, the pitches, which include the first and second groups including the first protrusion body 230, the first protrusion body 230, the first protrusion body 230, the second protrusion body 240, and the second protrusion body 240 in this order, may be repeatedly formed over the entire region of the groove 220.

As described above, in the present invention, the pitches having a combination of the first protrusion bodies 230 and the second protrusion bodies 240 may be repeatedly formed at predetermined intervals over the entire region of the groove 220.

The first protrusion body 230 and the second protrusion body 240 according to the second embodiment may extend at an angle parallel to the circumferential direction of the tire.

That is, the first protrusion bodies 230 and the second protrusion bodies 240 may be formed on the bottom surface and the wall surfaces of the groove 220 and extend in the extension direction of the groove 220.

As described above, the first protrusion bodies 130 and 230 and the second protrusion bodies 140 and 240 according to the first and second embodiments may extend to have an angle of 0 degree or more and 360 degrees or less when an angle of the protrusion body extending in parallel with the circumferential direction of the tire is 0 degree.

A cross-sectional shape of the protrusion body may be a circular or polygonal shape. The protrusion bodies may each have a height constant in the longitudinal direction of the groove 120, or the height of the protrusion body may vary in the longitudinal direction of the groove 120. For example, the protrusion bodies extend in the longitudinal direction of the groove 120, and the height of the protrusion body may be constant, gradually increased, gradually decreased, or increased and decreased.

The protrusion portion may extend in the longitudinal direction of the groove and extend in a rectilinear or curved shape.

In the present invention configured as described above, the first and second protrusion bodies 230 and 240, which are provided in the form of fine protrusions, are applied to the entire wall surfaces and the entire bottom surface of the groove 220, thereby ensuring a larger surface area. Further, the protrusion bodies formed on the entire exposed surface of the groove 220 dissipate noise energy by generating a large amount of thermal friction energy, thereby reducing the air column resonance sound.

In addition, as illustrated in FIG. 4, the first protrusion body 230 and the second protrusion body 230 formed in the groove 220 may have different sizes and intersect each other to disperse and cancel the resonance sound, thereby significantly improving noise reducing efficiency.

As illustrated in FIG. 3, the plurality of wall surface protrusion portions may be separated by the fluid flow paths 250. A cross-sectional shape of the protrusion body included in the wall surface protrusion portion may be a trapezoidal shape in the longitudinal direction of the groove, and an angle of the trapezoidal shape may be 65 to 85°, particularly 90°.

As illustrated in FIGS. 2 to 3, the low noise tire may include the fluid flow path 250 formed along the wall surface of the groove 220 and configured to provide a flow path for air in the groove 220. The fluid flow paths 250 may be formed in the wall surface protrusion portions formed on flat two opposite side wall bodies having no curved portion. A length of one fluid flow path in a wall body direction may be equal to a length of the wall surface protrusion portion.

In another embodiment, the fluid flow paths 250 may be provided in the flat wall surface protrusion portion and the coupling protrusion portion formed as a curved portion. Therefore, the fluid flow paths 250 may be formed in all the portions of the groove 220, except for the bottom surface of the groove, thereby easily removing fluid droplets trapped between the protrusion portions.

The fluid flow path 250 may be formed at a predetermined angle with respect to the longitudinal direction of the wall surface protrusion portion and formed along the wall surface of the groove 220. The fluid flow path 250 may divide the protrusion portions while traversing the protrusion portions, so that the fluid positioned in the protrusion portions may move. That is, the fluid flow path 250 may be formed as a groove-shaped path that passes through the plurality of wall surface protrusion portions. The fluid flow path 250 may divide the protrusion bodies, which protrude from two opposite side wall surfaces of the groove 220, into a plurality of protrusion bodies.

As illustrated in FIG. 3, the plurality of fluid flow paths 250 may be formed in one block 210. In the case of the protrusion bodies included in the wall surface protrusion portions formed adjacent to the fluid flow path 250, a length of the fluid flow path in the longitudinal direction of the groove, which is a distance between one protrusion body and another protrusion body, may be set to a, and the length a between the fluid flow paths may be 0.03 to 5 mm. A length of the protrusion body, which is included in the wall surface protrusion portion adjacent to the fluid flow path, may be 3 to 20 mm in the longitudinal direction of the groove.

In the related art, during a process of manufacturing a core for tire mold casting, moisture cannot be discharged while the core containing a mixture of gypsum and water is hardened, which may cause a situation in which the surface layer is roughened.

Unlike the related art, in the case of the present invention, the fluid flow paths 250 are formed in the direction that is not parallel to the longitudinal direction of the groove 220, and the fluid droplets trapped between the protrusion bodies of the protrusion portions are discharged along the flow paths of the fluid flow paths 250. Therefore, moisture contained in the core is discharged through the fluid flow paths 250 during the process of manufacturing the core, such that the surface layer of the core may be prevented from being roughened. Therefore, it is possible to manufacture the tire 200 with a smooth surface during the process of manufacturing the tire 200 by using the core. In addition, the fluid droplets trapped between the protrusion portions may be discharged through the fluid flow paths, thereby improving the water discharge performance of the tire 200.

FIG. 5A is a top plan view of the abrasion indicator 260, and FIG. 5B is a view illustrating a length of a support groove 261 in the direction perpendicular to the longitudinal direction of the groove 220.

As illustrated in FIGS. 1 and 5, the low noise tire 200 may include the abrasion indicator 260 protruding from the bottom surface of the groove 220. In this case, the abrasion indicator 260 may include the support groove 261 provided in the form of a flat plate-shaped groove in the bottom surface of the groove 220, and a recognition protrusion body 262 protruding from an upper portion of the support groove 261 and coupled to at least a part of the groove 220. Therefore, the abrasion indicator 260 is formed to allow a user to visibly identify a degree of abrasion of the tire.

As illustrated in FIG. 5B, the support groove 261 may be provided in the form of a flat plate-shape groove in the bottom protrusion portions of the groove 220. A length of the support groove 261 in the direction perpendicular to the longitudinal direction of the groove may be set to e that is equal to the length of the bottom protrusion portion formed in parallel and having no curved portion.

A length A between one side edge of the support groove 261 and one side lower edge of the recognition protrusion body 262 in the longitudinal direction of the groove 220 may be 3 to 15 mm. A length A between the other side edge of the support groove 261 and the other side lower edge of the recognition protrusion body 262 in the longitudinal direction of the groove may be 3 to 15 mm.

In the related art, a peripheral portion of the abrasion indicator 260 is formed as an uneven protrusion, which makes it impossible to measure an accurate height of the abrasion indicator 260. Therefore, in the present invention, the support groove 261 is formed to be flat by removing elements adjacent to the recognition protrusion body 262, thereby measuring an accurate height of the recognition protrusion body 262.

The recognition protrusion body 261 may protrude from the support groove 262. Two opposite surfaces of the recognition protrusion body 261 based on the direction perpendicular to the longitudinal direction of the groove 220 may be coupled to the protrusion portions. Therefore, a lower surface of the recognition protrusion body 261 is coupled to the support groove 262, and the two opposite surfaces of the recognition protrusion body 261 are coupled to the protrusion portions. Therefore, it is possible to prevent the recognition protrusion body 262 from being cracked or damaged when a strong impact is applied because of a rapid curve or the like. A cross-sectional shape of the recognition protrusion body 262 in the longitudinal direction of the groove may be any one selected from trapezoidal, rectangular, semicircle, and semi-elliptical shapes.

As illustrated in FIG. 6, the low noise tire 200 may include the air slags 251 irregularly formed in groove shapes in the protrusion portions formed in the groove. The air slags 251 may be formed in groove shapes in the groove 220 or the protrusion portions and additionally reduce noise. Even though the tire is abraded, the air slags 251 formed in groove shapes may define empty spaces in the tire surface, thereby improving the water discharge performance of the tire 200.

Figure 7:
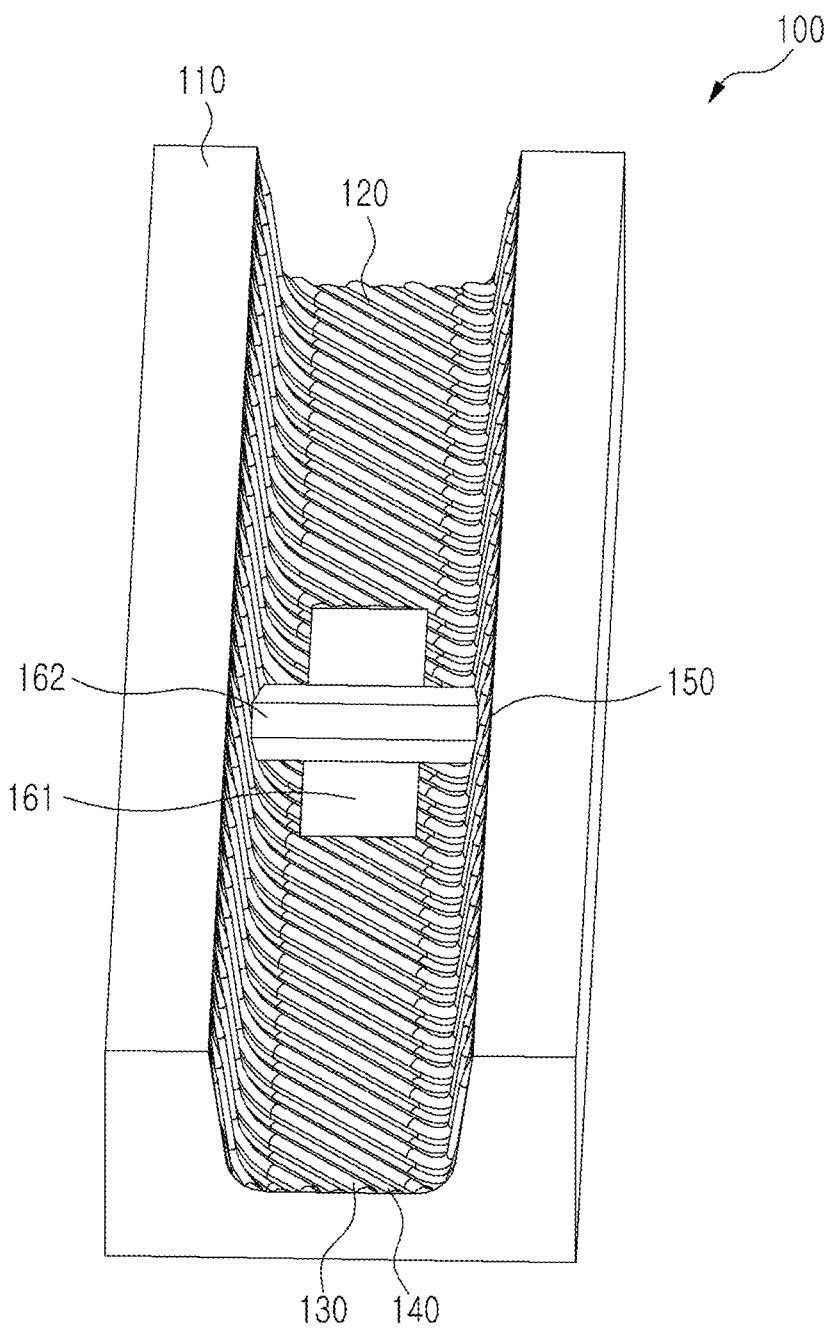
FIG. 7 is a perspective view of a low noise tire according to a first embodiment of the present invention.
Figure 8:
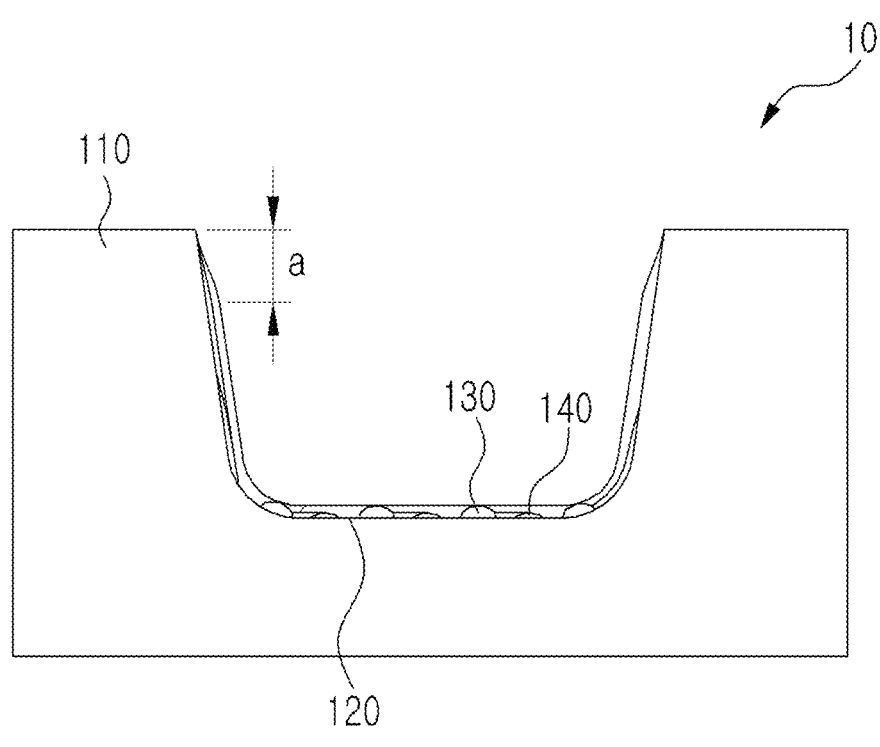
FIG. 8 is a front view of the low noise tire according to the first embodiment of the present invention.
Figure 9:
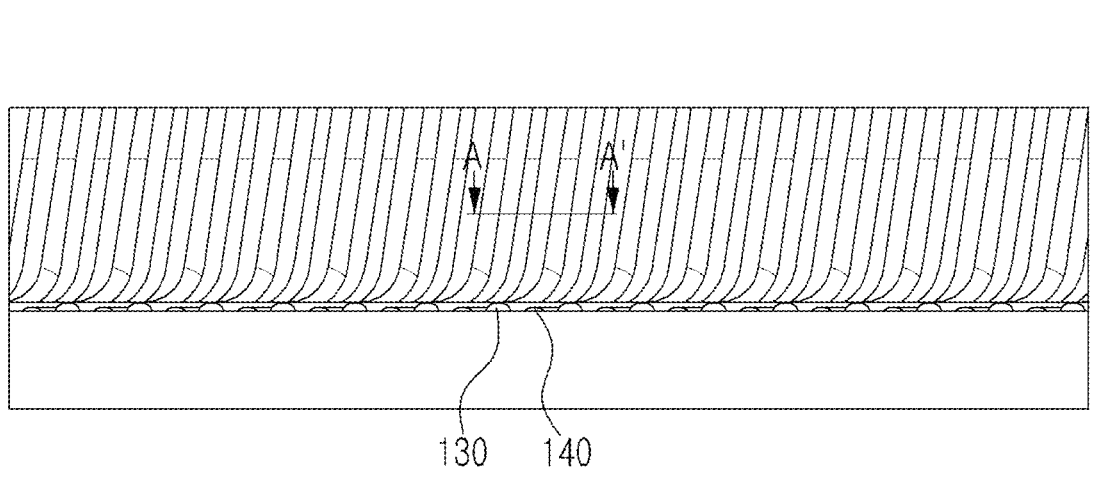
FIG. 9 is a cross-sectional view illustrating the low noise tire according to the first embodiment of the present invention when viewed from the lateral side.
Figure 10:
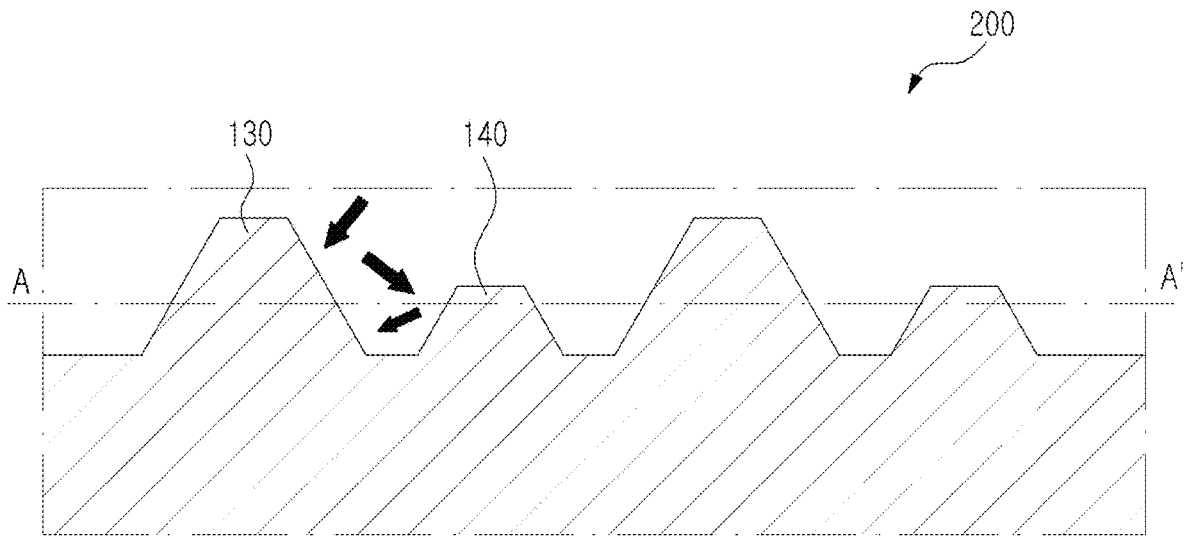
FIG. 10 is a cross-sectional view taken along line A-A' in FIG. 9.
Figure 11:
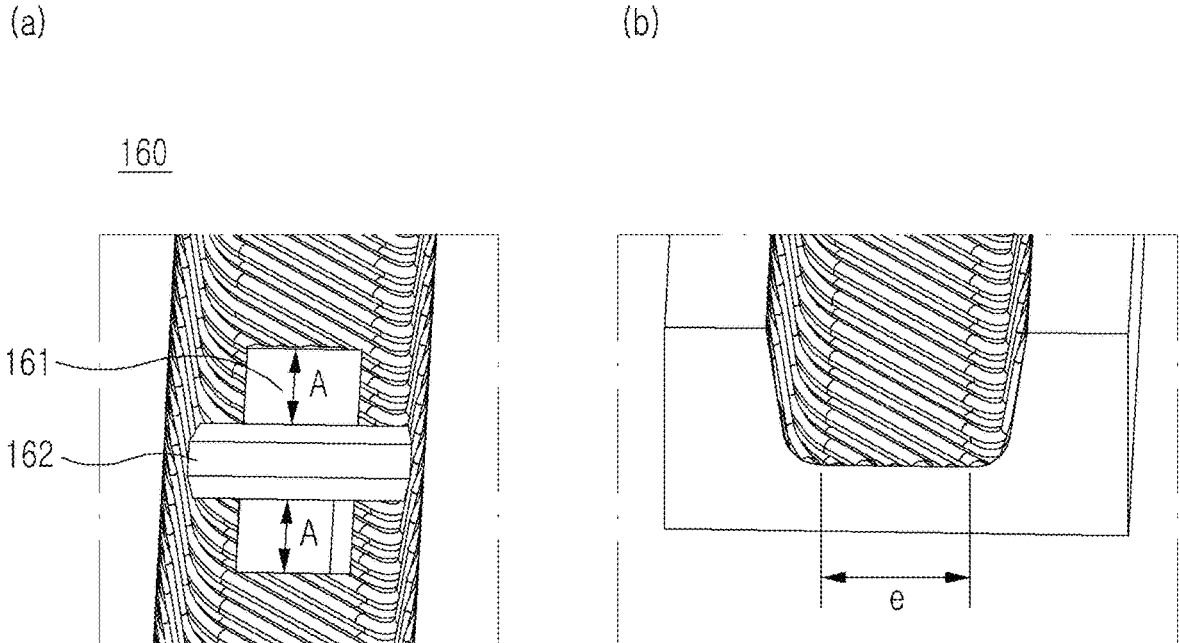
FIG. 11 is a top plan view illustrating an abrasion indicator according to the first embodiment of the present invention.

FIG. 7 is a perspective view of a low noise tire according to a first embodiment of the present invention, FIG. 8 is a front view of the low noise tire according to the first embodiment of the present invention, FIG. 9 is a cross-sectional view illustrating the low noise tire according to the first embodiment of the present invention when viewed from the lateral side, FIG. 10 is a cross-sectional view taken along line A-A' in FIG. 9, and FIG. 11 is a top plan view illustrating an abrasion indicator according to the first embodiment of the present invention.

As illustrated in FIGS. 7 to 11, a low noise tire 100 according to a first embodiment of the present invention may include blocks 110, a groove 120, a plurality of protrusion portions, fluid flow paths 150, an abrasion indicator 160, and air slags 151. The plurality of blocks 110 may be formed on a tire tread and define portions that come into contact with the ground surface.

The groove 120 may be formed between the blocks 110 and define a main groove extending in a circumferential direction of the tire. The groove 120 may include one side wall surface inclined downward from an upper portion and formed to be straight and flat, a bottom surface coupled to one side wall surface and formed to be straight and parallel to the ground surface, and the other side wall surface coupled to the bottom surface and formed to be flat and symmetric together with one side wall surface. The groove 120 may include one side coupling surface coupled to one side wall surface and the bottom surface and formed as a curved portion, and the other side coupling surface coupled to the other side wall surface and the bottom surface and formed as a curved portion.

The protrusion portions may include bottom protrusion portions protruding from the bottom surface of the groove and extending along the groove, wall surface protrusion portions protruding from one wall surface and the other wall surface of the groove and extending along the groove, and coupling protrusion portions coupled to one side coupling surface and the other side coupling surface and formed as curved portions.

The protrusion portions may include a plurality of protrusion bodies protruding from the bottom surface and the wall surfaces of the groove, extending along the groove, and having different heights. The protrusion bodies may be classified into one or more types depending on the heights thereof. The protrusion bodies may be provided to define one pitch and reduce noise energy by increasing thermal friction energy generated by the flow.

Hereinafter, the plurality of protrusion bodies, which constitute the protrusion portions, will be described with reference to a specific embodiment. However, the number of protrusion bodies included in the protrusion portion is not limited to two. Hereinafter, for convenience of description, the number of protrusion bodies is described as being two.

However, the number of protrusion bodies having different heights is not limited to two, and the number of protrusion bodies may be two or more.

The protrusion portion may include a first protrusion body 130 and a second protrusion body 140.

The plurality of first protrusion bodies 130 may protrude from the bottom surface and the wall surfaces of the groove 120.

The second protrusion body 140 may protrude from the bottom surface and the wall surface of the groove.

In this case, a protruding height of the first protrusion body 130 may be larger than a protruding height of the second protrusion body 140. More specifically, a height from a bottom of the second protrusion body 140 may be 0 to 90% of a height from a bottom of the first protrusion body 130.

For example, a height of the first protrusion body 130 may be 0.1 to 2 mm, and a height of the second protrusion body 140 may be 0.09 to 1.8 mm.

However, the protruding height of the first protrusion body 130 may be equal to the protruding height of the second protrusion body 140.

Further, the first protrusion body 130 and the second protrusion body 140 may extend in parallel with each other. The first protrusion body 130 and the second protrusion body 140 may be spaced apart from each other at a predetermined interval.

For example, the interval between the first protrusion body and the second protrusion body may be 0.05 to 4 mm.

The first protrusion bodies 130 and the second protrusion bodies 140, which are provided as described above, may be provided at predetermined intervals over the entire region of the groove 120.

More specifically, one or more first protrusion bodies 130 and one or more second protrusion bodies 140 are included and provided to define one pitch, and the pitches may be repeatedly formed over the entire region of the groove 120.

For example, the pitch may include one first protrusion body 130 and one second protrusion body 140, and the plurality of pitches may be repeatedly formed at predetermined intervals.

Alternatively, the pitch may include the first protrusion body 130, the second protrusion body 140, the second protrusion body 140, and the first protrusion body 130 in this order, and the pitches may be repeatedly formed at predetermined intervals.

In addition, the pitch may be provided such that a first group including one or more first protrusion bodies 130 and a second group including one or more second protrusion bodies 140 intersect each other.

For example, the first group may include three first protrusion bodies 130 and two second protrusion bodies 140. Further, the pitches, which include the first and second groups including the first protrusion body 130, the first protrusion body 130, the first protrusion body 130, the second protrusion body 140, and the second protrusion body 140 in this order, may be repeatedly formed over the entire region of the groove 120.

As described above, in the present invention, the pitches having a combination of the first protrusion bodies 130 and the second protrusion bodies 140 may be repeatedly formed at predetermined intervals over the entire region of the groove 120.

The first protrusion body 130 and the second protrusion body 140 according to the first embodiment may extend at an angle that is not parallel to the circumferential direction of the tire.

That is, the first protrusion body 130 and the second protrusion body 140 may extend obliquely from an upper end of one side wall surface of the groove 120 to the bottom surface of the groove 120 and an upper end of the other side wall surface of the groove 120.

When the first protrusion body 130 and the second protrusion body 140 extends in the direction that is not parallel to the circumferential direction of the tire, a height of two opposite ends a of each of the first and second protrusion bodies 130 and 140 decreases toward the upper end of the wall surface of the groove 120, such that the height at an uppermost end of the groove 120 converges on 0 to 2 mm, as illustrated in FIG. 8. Specifically, if the height of the two opposite ends a of each of the first and second protrusion bodies 130 and 140 at the uppermost end of the groove 120 exceeds 2 mm, the wet traveling performance may deteriorate. Therefore, the height may be limited to 2 mm or less. However, the present invention does not exclude all the cases in which the height of the two opposite ends a of each of the first and second protrusion bodies 130 and 140 at the uppermost end of the groove 120 exceeds 2 mm, and any modification may be possible, as necessary.

In this case, the two opposite ends a of each of the first and second protrusion bodies 130 and 140 may refer to portions corresponding to points of 10 to 50% of an overall depth of the groove 120 from the upper end of the groove 120.

A cross-sectional shape of the protrusion body may be a circular or polygonal shape.

The protrusion bodies may each have a height constant in the longitudinal direction of the groove 120, or the height of the protrusion body may vary in the longitudinal direction of the groove 120. For example, the protrusion portions extend in the longitudinal direction of the groove 120, and the height of the protrusion body may be constant, gradually increased, gradually decreased, or increased and decreased.

The protrusion body may extend in the longitudinal direction of the groove and extend in a rectilinear or curved shape.

In the present invention configured as described above, the first and second protrusion bodies 130 and 140, which are provided in the form of fine protrusions, are applied to the entire wall surfaces and the entire bottom surface of the groove 120, thereby ensuring a larger surface area. Further, the protrusion portions formed on the entire exposed surface of the groove 120 dissipate noise energy by generating a large amount of thermal friction energy, thereby reducing the air column resonance sound.

In addition, as illustrated in FIG. 10, the first protrusion body 130 and the second protrusion body 130 formed in the groove 120 may have different sizes and intersect each other to disperse and cancel the resonance sound, thereby significantly improving the noise reducing efficiency.

As illustrated in FIGS. 7 to 8, the low noise tire 100 may include the fluid flow paths 150 formed along the wall surface of the groove 120 and configured to provide flow paths for air in the groove 120. The fluid flow path 150 may be formed as a path formed by an intervening space between one protrusion body and another protrusion body. In one embodiment, in the case of the first protrusion body 130 and the second protrusion body 140 formed on one side wall surface and the other side wall surface of the groove 120, a portion between the first and second protrusion bodies 130 and 140, which are formed adjacent to each other, may refer to the fluid flow path 150.

In the related art, during a process of manufacturing a core for tire mold casting, moisture cannot be discharged while the core containing a mixture of gypsum and water is hardened, which may cause a situation in which the surface layer is roughened.

Unlike the related art, in the case of the present invention, moisture contained in the core is discharged through the fluid flow paths 150 during the process of manufacturing the core, such that the surface layer of the core may be prevented from being roughened. Therefore, it is possible to manufacture the tire 100 with a smooth surface during the process of manufacturing the tire by using the core. In addition, because the protrusion bodies extend obliquely, the fluid droplets trapped between the protrusion portions may be discharged through the fluid flow path 150 between one protrusion body and another protrusion body, thereby improving the water discharge performance of the tire.

FIG. 11A is a top plan view of the abrasion indicator 160, and FIG. 11B is a view illustrating a length of a support groove 161 in the direction perpendicular to the longitudinal direction of the groove 120.

As illustrated in FIGS. 7 and 11, the low noise tire 100 may include the abrasion indicator 160 protruding from the bottom surface of the groove 120. In this case, the abrasion indicator 160 may include the support groove 161 provided in the form of a flat plate-shaped groove in the bottom surface of the groove 120, and a recognition protrusion body 162 protruding from an upper portion of the support groove 161 and coupled to at least a part of the groove 120. Therefore, the abrasion indicator 160 is formed to allow a user to visibly identify a degree of abrasion of the tire.

As illustrated in FIG. 11B, the support groove 161 may be provided in the form of a flat plate-shape groove in the bottom protrusion portions of the groove 120. A length of the support groove 161 in the direction perpendicular to the longitudinal direction of the groove may be set to e that is equal to the length of the bottom protrusion portion formed in parallel and having no curved portion.

A length A between one side edge of the support groove 161 and one side lower edge of the recognition protrusion body 162 in the longitudinal direction of the groove 120 may be 3 to 15 mm. A length A between the other side edge of the support groove 161 and the other side lower edge of the recognition protrusion body 162 in the longitudinal direction of the groove may be 3 to 15 mm.

In the related art, a peripheral portion of the abrasion indicator 160 is formed as an uneven protrusion, which makes it impossible to measure an accurate height of the abrasion indicator 160. Therefore, in the present invention, the support groove 162 is formed to be flat by removing elements adjacent to the recognition protrusion body 161, thereby measuring an accurate height of the recognition protrusion body 161.

The recognition protrusion body 161 may protrude from the support groove 162. Two opposite surfaces of the recognition protrusion body 161 based on the direction perpendicular to the longitudinal direction of the groove 120 may be coupled to the protrusion portions. Therefore, a lower surface of the recognition protrusion body 161 is coupled to the support groove 162, and the two opposite surfaces of the recognition protrusion body 161 are coupled to the protrusion portions. Therefore, it is possible to prevent the recognition protrusion body 161 from being cracked or damaged when a strong impact is applied because of a rapid curve or the like. A cross-sectional shape of the recognition protrusion body 162 in the longitudinal direction of the groove may be any one selected from trapezoidal, rectangular, semicircle, and semi-elliptical shapes.

As illustrated in FIG. 6, the low noise tire 100 may include the air slags 151 irregularly formed in groove shapes in the protrusion portions formed in the groove 120. The air slags 151 may be formed in groove shapes in the groove 120 or the protrusion portions and additionally reduce noise. Even though the tire is abraded, the air slags 151 formed in groove shapes may define empty spaces in the tire surface, thereby improving the water discharge performance of the tire 100.

According to the effect of the present invention configured as described above, the protrusion portions, which are provided in the form of fine protrusions, may be applied to the entire groove wall surfaces and the entire bottom surface, thereby ensuring a larger surface area. Further, the protrusion portions formed on the entire exposed surface of the groove may dissipate noise energy by generating a large amount of thermal friction energy.

In addition, according to the effect of the present invention, the first and second protrusion bodies formed in the groove may have different sizes and intersect each other to disperse and cancel the resonance sound, thereby improving the noise reducing efficiency.

In addition, according to the effect of the present invention, it is possible to form the fluid flow path to prevent the surface layer from being roughened because moisture cannot be discharged during the mold casting process.

In addition, according to the effect of the present invention, it is possible to form the abrasion indicator to identify the degree of abrasion of the tire.

In addition, according to the effect of the present invention, it is possible to form the abrasion indicator on the flat surface to measure the accurate height of the abrasion indicator.

The effects of the present invention are not limited to the above-mentioned effects, and it should be understood that the effects of the present invention include all effects that may be derived from the configuration of the present invention disclosed in the detailed description of the present invention or the appended claims.

It will be appreciated that the embodiments of the present invention have been described above for purposes of illustration, and those skilled in the art may understand that the present invention may be easily modified in other specific forms without changing the technical spirit or the essential features of the present invention. Therefore, it should be understood that the above-described embodiments are illustrative in all aspects and do not limit the present specification. For example, each component described as a single type may be carried out in a distributed manner. Likewise, components described as a distributed type can be carried out in a combined type.

The scope of the present invention is represented by the claims to be described below, and it should be interpreted that the meaning and scope of the claims and all the changes or modified forms derived from the equivalent concepts thereto fall within the scope of the present invention.

DESCRIPTION OF REFERENCE NUMERALS

100, 200: Low noise tire
110, 210: Block
120, 220: Groove
130, 230: First protrusion body
140, 240: Second protrusion body
150, 250: Fluid flow path
151, 251: Air slag
160, 260: Abrasion indicator

161, 261: Support groove
162, 262: Recognition protrusion body

What is claimed is:

1. A low noise tire comprising:

a plurality of blocks positioned on a tread;

a groove defined between adjacent ones of the plurality of blocks and extending in a circumferential direction of a tire;

protrusion portions, each including a plurality of protrusion bodies protruding from a bottom surface and a wall surface of the groove, the plurality of protrusion bodies extending along the groove;

fluid flow paths defined along the wall surface of the groove, each of the fluid flow paths dividing adjacent ones of the protrusion portions while traversing a longitudinal direction of the protrusion portions so that a fluid between the protrusion portions moves through the fluid flow paths;

an abrasion indicator coupled to the bottom surface of the groove and protruding from the bottom surface of the groove; and air slags irregularly defined in groove shapes in the groove or the protrusion portions disposed in the groove, each of the air slags being an empty space configured to reduce noise of the low noise tire, wherein the bottom surface of the groove does not have the fluid flow paths defined thereon, wherein the plurality of protrusion bodies is configured to reduce noise energy by generating thermal friction energy, wherein the abrasion indicator comprises:

a support groove defined in a form of a flat plate-shape groove in the bottom surface of the groove; and a recognition protrusion body protruding from an upper portion of the support groove.

2. The low noise tire of claim 1, wherein a width of each of the fluid flow paths is 0.03 to 5 mm.

3. The low noise tire of claim 1, wherein each of the protrusion portions comprises:

a plurality of first protrusion bodies protruding from the bottom surface and the wall surface of the groove; and a plurality of second protrusion bodies protruding from the bottom surface and the wall surface of the groove.

4. The low noise tire of claim 3, wherein one or more of the plurality of first protrusion bodies and one or more of the plurality of second protrusion bodies form one pitch, and the one pitch is repeatedly disposed to form a plurality of pitches.

5. The low noise tire of claim 4, wherein each of the plurality of pitches includes a first group including the one or more of the plurality of first protrusion bodies and a second group including the one or more of the plurality of second protrusion bodies, the first group and the second group being disposed in an alternating manner.

6. The low noise tire of claim 3, wherein a distance between one first protrusion body of the plurality of first protrusion bodies and one second protrusion body of the plurality of second protrusion bodies is 0.05 to 4 mm along a width direction of the low noise tire, the one first protrusion body and the one second protrusion body being adjacent to each other.

7. The low noise tire of claim 1, wherein the plurality of protrusion bodies is defined in parallel.

8. The low noise tire of claim 1,
wherein when the protrusion portions extend in a direction that is not parallel to the circumferential direction of the tire, a height of two opposite ends of each of the protrusion portions decreases toward an upper end of the wall surface of the groove, and the height of the two opposite ends at an uppermost end of the groove is 0 to 2 mm.

9. The low noise tire of claim 8,
wherein the two opposite ends of each of the protrusion portions are points of 10 to 50% of an overall depth of the groove from the upper end of the groove.

10. The low noise tire of claim 1,
wherein the plurality of protrusion bodies is spaced apart from one another at predetermined intervals and defined over an entire region of the groove.

11. The low noise tire of claim 1,
wherein a cross-sectional shape of each of the plurality of protrusion bodies is a circular or polygonal shape.

12. The low noise tire of claim 1,
wherein each of the plurality of protrusion bodies has a height constant in a longitudinal direction of the groove.

13. The low noise tire of claim 1,
wherein each of the plurality of protrusion bodies extends in a longitudinal direction of the groove in a rectilinear or curved shape.

\* \* \* \* \*